US007000195B2

(12) United States Patent
Komuro

(10) Patent No.: US 7,000,195 B2
(45) Date of Patent: Feb. 14, 2006

(54) VIEWER SYSTEM AND METHOD ALLOCATING A DEGREE OF IMPORTANCE TO A NETWORK ADDRESS BASED UPON FREQUENCY OF DISPLAY

(75) Inventor: Toshinao Komuro, Numazu (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/274,250

(22) Filed: Mar. 23, 1999

(65) Prior Publication Data

US 2002/0186239 A1 Dec. 12, 2002

(30) Foreign Application Priority Data

Sep. 24, 1998 (JP) ................................ 10-269277

(51) Int. Cl.
*G06F 3/14* (2006.01)

(52) U.S. Cl. ...................................... 715/805; 715/772

(58) Field of Classification Search ........ 345/811–812, 345/760, 752, 749, 854; 11/744–746, 747; 709/11, 207, 202; 707/100, 3; 715/748–749, 715/854, 811, 745, 804, 805, 734, 736, 738–739, 715/772, 821–824, 760

See application file for complete search history.

(56) References Cited

U.S. PATENT DOCUMENTS 5,420,975 A * 5/1995 Blades et al. ............... 345/811
5,583,763 A * 12/1996 Atcheson et al. ........... 345/812
5,634,008 A * 5/1997 Gaffaney et al. ........... 345/854
5,751,271 A * 5/1998 Anstötz et al. ............. 345/811
5,854,630 A * 12/1998 Nielsen ...................... 345/854
5,880,740 A * 3/1999 Halliday et al. ............ 345/629
5,977,964 A * 11/1999 Williams et al. ............ 715/721
6,005,567 A * 12/1999 Nielsen ...................... 345/744
6,011,554 A * 1/2000 King et al. ................. 345/854
6,035,377 A * 3/2000 James et al. ................ 711/147
6,044,376 A * 3/2000 Kurtzman, II ............. 707/102
6,108,637 A * 8/2000 Blumenau ...................... 705/7
6,160,552 A * 12/2000 Wilsher et al. ............. 715/739
6,182,122 B1 * 1/2001 Berstis ....................... 709/217
6,271,840 B1 * 8/2001 Finseth et al. .............. 715/513
6,339,750 B1 * 1/2002 Hoyer et al. ................ 702/182
6,381,635 B1 * 4/2002 Hoyer et al. ................ 709/207
6,421,675 B1 * 7/2002 Ryan et al. ................. 707/100
6,442,139 B1 * 8/2002 Hosein ....................... 370/236
6,745,224 B1 * 6/2004 D'Souza et al. ............ 709/202
6,771,290 B1 * 8/2004 Hoyle ........................ 715/745

* cited by examiner

*Primary Examiner*—Steven Sax
(74) *Attorney, Agent, or Firm*—Staas & Halsey LLP

(57) ABSTRACT

A viewer in the form of a browser displays a Web page which is accessible by an associated unique identifying information. The associated identifying information is a URL. The viewer includes a definition management note which stores a number of times of display of any Web page which has been accessed by an associated URL. The viewer also includes an importance degree control unit to count a number of times of display of any Web page accessed by the unique URL. The importance degree control unit outputs a number for storage by the definition management note. When the counted number of times of access of a unique URL exceeds a threshold value, the associated Web page is automatically updated to a bookmark by way of the unique URL. A number of different processes may be executed to sort the URLs registered in the bookmark according to a degree of importance. The different processes include assigning different colors to the URLs or changing a display in a Web page accessed by a registered URL.

23 Claims, 20 Drawing Sheets

18

DEFINITION MANAGEMENT NOTE

| URL | IMPORTANCE DEGREE | THRESHOLD VALUE | IMPORTANCE DEGREE MARK | | NO. OF TIMES OF USE | AUTOMATIC REGISTERING | |
|---|---|---|---|---|---|---|---|
| | | | FORMAT | MARK | | REGISTER FLAG | CATEGORY NAME |
| http://aaa.co.jp/ | 20 | 20 | LETTER | MUCH | 10 | YES | SEARCH |
| | 10 | 10 | LETTER | INTERMEDIATE | 10 | NO | |
| http://b b.co.jp/ | 3 | 10 | FIGURE | LEVEL 3.GIF | 1 | YES | HOBBY |
| | 1 | 5 | FIGURE | LEVEL 1.GIF | 1 | NO | |
| : | : | : | : | : | : | : | : |

FIG. 2

VIEWER SYSTEM AND METHOD ALLOCATING A DEGREE OF IMPORTANCE TO A NETWORK ADDRESS BASED UPON FREQUENCY OF DISPLAY

CROSS-REFERENCE TO RELATED APPLICATIONS

This application is based upon and claims priority of Japanese Patent Application No. 10-269277 filed Sep. 24, 1998, the contents being incorporated herein by reference.

BACKGROUND OF THE INVENTION

The present invention relates to the art of counting a number of times that images accessed by unique identifying information is displayed during a display of images. More particularly, the present invention relates to the art of executing particular displays and processes during a display of images when the unique identifying information is displayed greater than a threshold value.

FIG. 14 (PRIOR ART) is an example of a conventional WWW browser for a terminal-server system according to the related art. As illustrated, a Web page is generated from WWW data 23 in a WWW server 10 and is down-loaded to a terminal 12 via network 11. The down-loaded Web page is then displayed by a WWW browser functioning unit 13.

A filter registering unit 21 and a filter functioning unit 22 are included in the WWW server 10 and strictly select an amount of information from the WWW data 23 by registering necessary information for each user.

The conventional WWW browser functioning unit 13 has only a function to realize a visual display which includes changing a color of a URL for a certain constant period when a displayed URL of the Web page is used, without reference to a number of times of display. In this regard, a user may only designate a Web page having a higher frequency of use by registering a URL to a bookmark 19. The URL registered to the bookmark 19 can then be displayed through selection from bookmark 19 without designating the actual address.

In the method according to the related art, the Web pages having a higher usability are accessed through registration with the bookmark 19. However, the number of times of display for each of the registered Web pages cannot be detected from the URLs which are accumulated in the bookmark 19. Moreover, since each URL displayed by an original Web page is registered as one Web page in the bookmark, an amount of information in the bookmark substantially increases.

Furthermore, when a URL of a Web page is used without relation to the number of times of display, the color of URL may change for a certain constant period but the information which is used for a certain user cannot be managed on the Web page. Thus, individual management is required for a user resulting in troublesome procedures.

BRIEF SUMMARY OF THE INVENTION

It is therefore an object of the present invention to solve the above-mentioned problem by setting a degree of importance for a display depending on a number of times of display in a WWW browser.

It is a further object of the present invention to display a mark indicating a degree of importance of a URL in a Web page itself.

Moreover, it is an even further object of the present invention to provide a URL having a predetermined degree of importance which is automatically sorted and registered to a bookmark.

It is still a further object of the present invention to realize management of information by a user easily and conveniently by automatically generating a Web page from information in a bookmark.

It is still a further object of the present invention to provide a browser which displays a URL on the Internet in order to register a number of times of display, a threshold value, and an importance degree process for each URL. Thereby, an importance degree process is executed by inspecting an adequacy of the degree of importance process registered for each display of a URL, such that a selected URL is registered to the bookmark upon exceeding the threshold value. The URL is then subsequently registered to a designated group at the time of registration to the bookmark, and the sequence in the bookmark is changed depending on the number of times of display of each registered URL.

By way of the present invention, a degree of importance can be set for a URL and displayed depending on a number of times of display for each of a plurality of users even in the same home page. Moreover, the page having a larger number of times of display can be registered automatically to the bookmark of the WWW browser and the Web page may be automatically generated with the registered bookmark information. Therefore, a user can easily realize information management and operation of the Web pages.

Objects of the present invention are achieved by a viewer to display images which are accessible by an associated identifying information, the viewer including a definition management note to store a number of times of display of any image which has been accessed by an associated unique identifying information; and an importance degree control unit to count a number of times of display of any image accessed by the unique identifying information, wherein the importance degree control unit outputs the number for storage by the definition management note.

Further objects of the present invention are achieved by a viewing method using a browser to display Web pages having associated URLs, including the steps of counting a number of times of display of a Web page accessed by an associated URL; and executing a particular process when the counted number of times exceeds a threshold value.

Even further objects of the present invention are achieved by a display method of an image which is accessible by an associated identifying information, the display method including the steps of storing a number of times of display of any image which has been accessed by an associated unique identifying information; and counting a number of times of display of any image accessed by the unique identifying information.

Moreover, objects of the present invention are achieved by a browser to display a Web page accessed via the Internet by an associated URL, the browser including a definition management note to store a number of times of display of any Web page which has been accessed by an associated URL; and an importance degree control unit to count a number of times of display of any Web page accessed by the URL, wherein the importance degree control unit outputs the number for storage by the definition management note.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIG. 2 is a block diagram showing a format of a management note according to a preferred embodiment of the present invention.

DETAILED DESCRIPTION OF THE PREFERRED EMBODIMENTS

Figure 1:
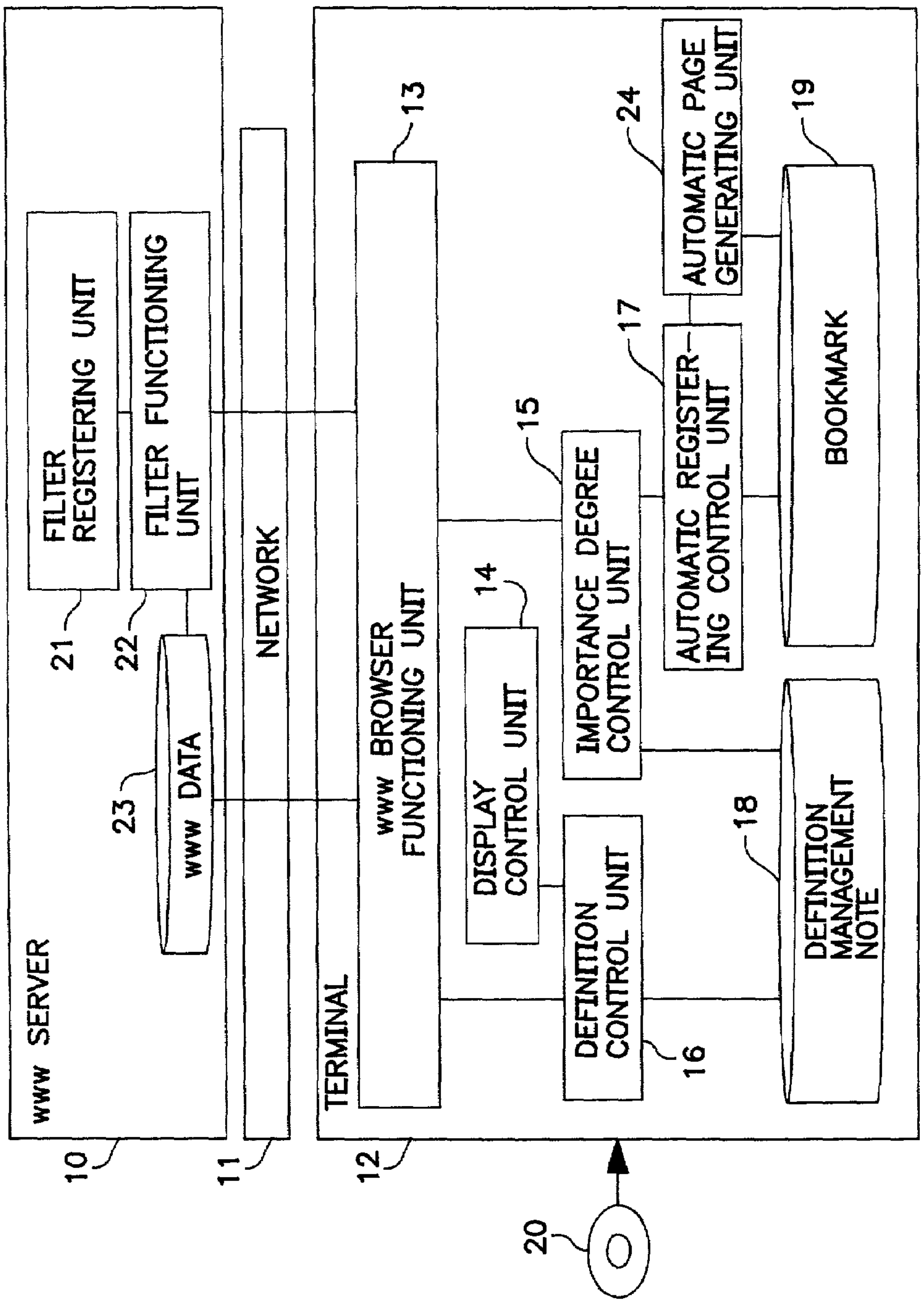
FIG. 1 is a block diagram illustrating a WWW browser which can set a degree of importance in a display according to a preferred embodiment of the present invention.

Reference will now be made in detail to the preferred embodiments of the present invention, examples of which are illustrated in the accompanying drawings, wherein like reference numerals refer to like elements throughout.

FIG. 1 is a block diagram illustrating a WWW browser which can set a degree of importance in a display according to a preferred embodiment of the present invention. As illustrated, WWW server 10 includes WWW data 23, filter registering unit 21 and filter functioning unit 22. Terminal 12 includes a WWW browser functioning unit 13, display control unit 14, an importance degree control unit 15, a definition control unit 16, an automatic registration control unit 17, a definition management note 18, a bookmark 19 and an automatic page generating unit 24. The WWW server 10 and the terminal 12 are connected through a network 11 such as the Internet, etc. According to the structure explained above, the Web page generated from the WWW data 23 in the WWW server 10 is down-loaded by the WWW browser functioning unit 13 of terminal 12 via network 11. The down-loaded Web page is transferred to the importance degree control unit 15 to check whether the URL in the Web page is registered or not in the definition management note 18.

When a URL is not yet registered in the definition management note 18 or the number of times of display has not reached the degree of importance, the WWW browser functioning unit 13 displays the down-loaded web page "as is." If the number of times of display reaches a degree of importance, such Web page is updated to be a Web page in which a degree of importance mark is given to the associated URL. In this case, registration of the URL to the bookmark is defined, such that the importance degree control unit 15 calls the automatic registration control unit 17 to automatically register the relevant URL to bookmark 19. Moreover, the automatic registration control unit 17 may call the automatic page generating unit 24 to automatically generate the Web page from the URL information in bookmark 19. The WWW browser functioning unit 13 displays each page depending on the updated definition management note 18.

Moreover, registration/deletion control unit 16, hereinafter "definition control unit 16", is called by selecting an icon with the WWW browser functioning unit 13, and the image to be registered or deleted is displayed by the WWW browser via the display control unit 14. Criteria for registration of an image to the definition management note 18 can be made by inputting a predetermined number of times of display, an importance degree, an importance degree mark, or a bookmark registration instruction. Meanwhile, when an image is to be deleted from definition management note 18, the definition information and the number of times of display registered to the definition management note can also be deleted.

Numeral 20 designates a medium for storing a program in relation to the present invention. This medium stores information which may be read from a computer, such as a CD-ROM, and may store a program to be operated in the terminal 12. The program of the terminal 12 of this invention is read to the terminal from the CD-ROM for execution.

FIG. 2 is a block diagram showing a structure of a definition management note according to a preferred embodiment of the present invention. The definition management note 18 is structured to include a URL name, an importance degree, a threshold value, an importance degree mark, a number of times of use (display), and automatic registration information. The URL of a registered Web page is managed by the URL name. For one URL name, a plurality of importance degree levels can be set. The number of times of use is set as a corresponding importance degree when the number of times of display has reached the threshold value. The importance degree mark corresponds to the degree of importance and is formed of a format and a mark.

As a format of a mark, examples may include characters, images, voices or colors to be set. The mark is used to display the degree of importance which corresponds to the set format. However, since image and voice require a large amount of data, file names of images and voices are preferably pre-set. The number of times of use is a column used to set a number of times for display of a relevant URL and this number of times is counted up when the relevant URL is used. This is then compared with the threshold value.

The automatic registering information is formed of a registering flag and a category name. For the registering flag, whether the relevant URL should be registered automatically to the bookmark or not when the number of times of display reaches the relevant importance degree and the category name of the bookmark for automatic registering is set to the category name. The category name is valid when registering is "YES". For example, when registering is "YES", the relevant URL is automatically registered to the designated category in the bookmark when the number of times of display reaches the relevant importance degree.

Figure 3:
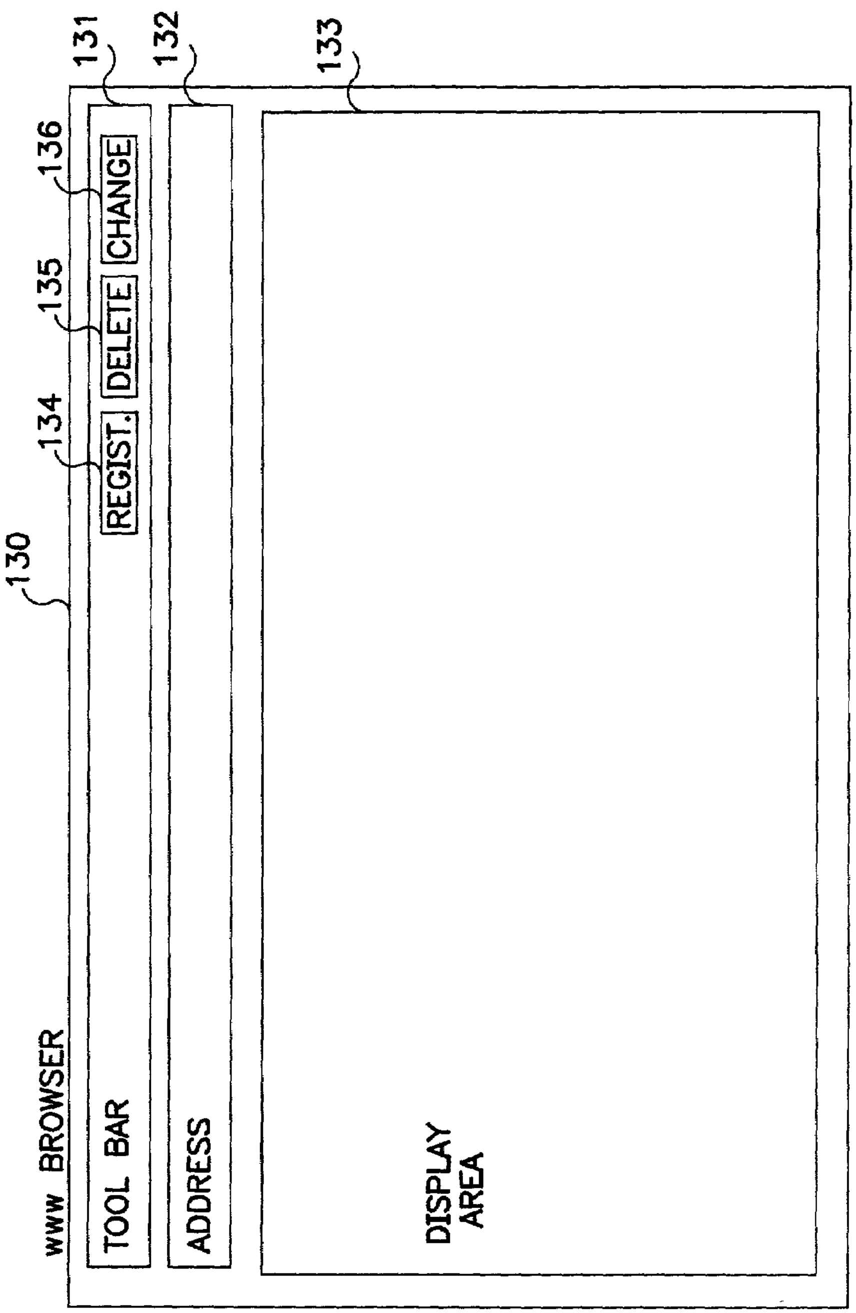
FIG. 3 is a block diagram showing an image format of a WWW browser according to a preferred embodiment of the present invention.

FIG. 3 is a block diagram illustrating an example of an image structure of a WWW browser according to a preferred embodiment of the present invention. As illustrated, image 130 of the WWW browser is formed of tool bar 131, address section 132, and display area 133. The tool bar 131 is formed by adding, to the tool bar of the related art, registering icon 134 for registering an importance degree to the definition management note 18, deleting icon 135 for deleting information of the definition management note 18 and change icon 136 for modifying information of the definition management note 18.

URL information is displayed in address section 132. In the display area 133, the page is displayed and input information for the other registration and information of the definition management note 18 to be deleted is also displayed.

Figure 4:
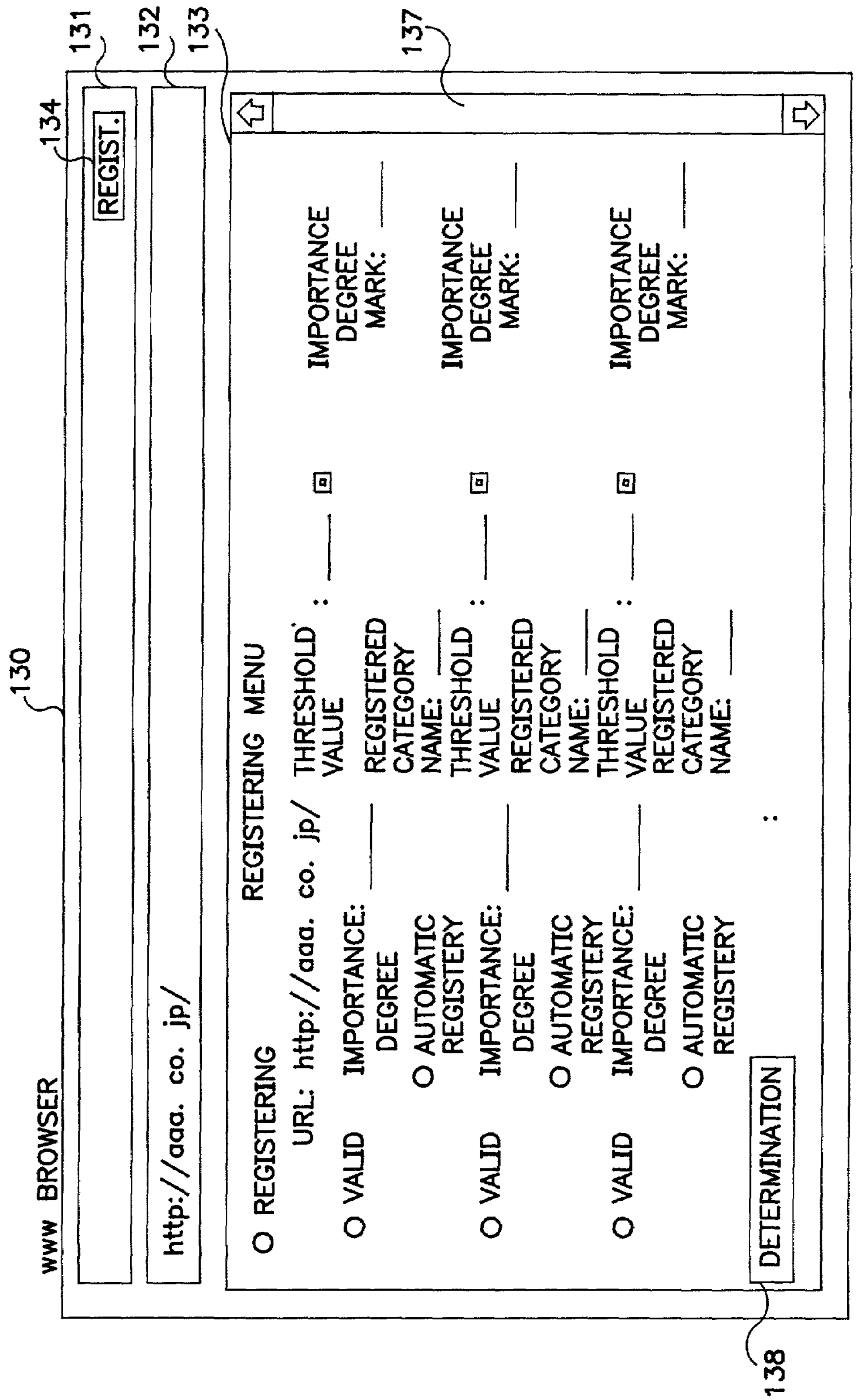
FIG. 4 is a block diagram of a degree of importance of a registering image.

FIG. 4 is a block diagram showing an example of the degree of importance registering image. In the display area 133 of the registering image, a menu for setting the URL information (information which is the same as address 132) as the registering object, importance degree and threshold value, importance degree mark to be displayed, and a "YES" or "NO" for requirement of automatic registering and category name of a bookmark for automatic registering is displayed. A user can perform registering by selecting a radio button given before "REGISTERING" and then clicking determination button 138. For the contents to be registered, the registering information can effectively be determined by selecting a radio button given before each information. Here, for the degree of importance mark, a character to be displayed may be designated directly or a path name of the file storing the information to be displayed may be designated. Moreover, it is also possible to set a plurality of importance degrees which cannot be displayed in one image by manipulating the scroll bar 137.

Figure 5:
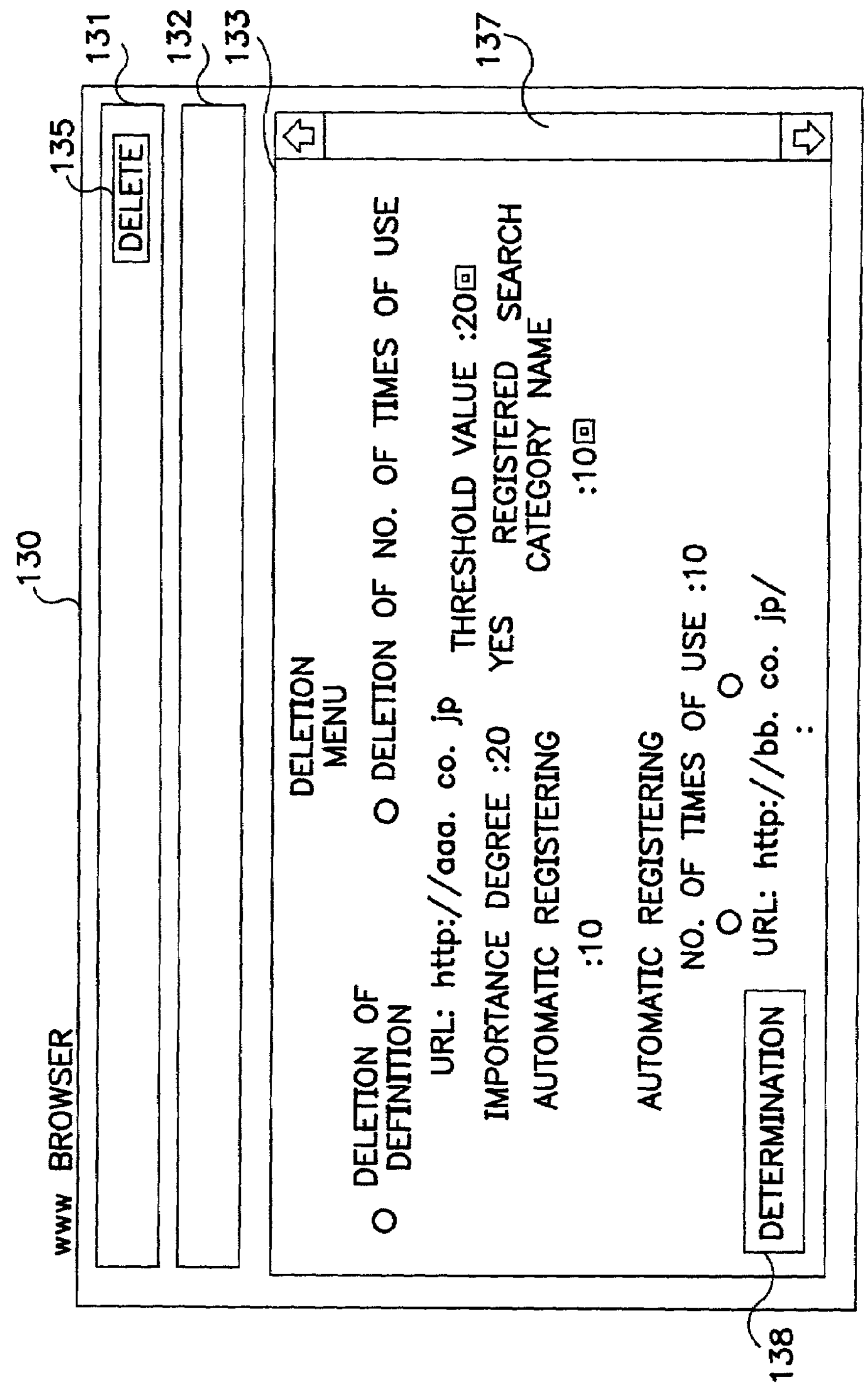
FIG. 5 is a block diagram of an example of an image to be deleted in a definition management note.

FIG. 5 is a block diagram showing an example of an image to be deleted in the definition management note 18 among the images registered. In the display area 133 of the image to be deleted, a list of information of all URLs registered in the definition management note 18 is displayed. When a large amount of information is registered, the scroll bar 137 must be manipulated. A user can delete the relevant definition information by selecting the radio button given in front of the "deletion of definition" and then clicking the determination button 138. Moreover, a user can also delete only the number of times of display by selecting the radio button in front of the "deletion of the number of times of display".

Figure 6:
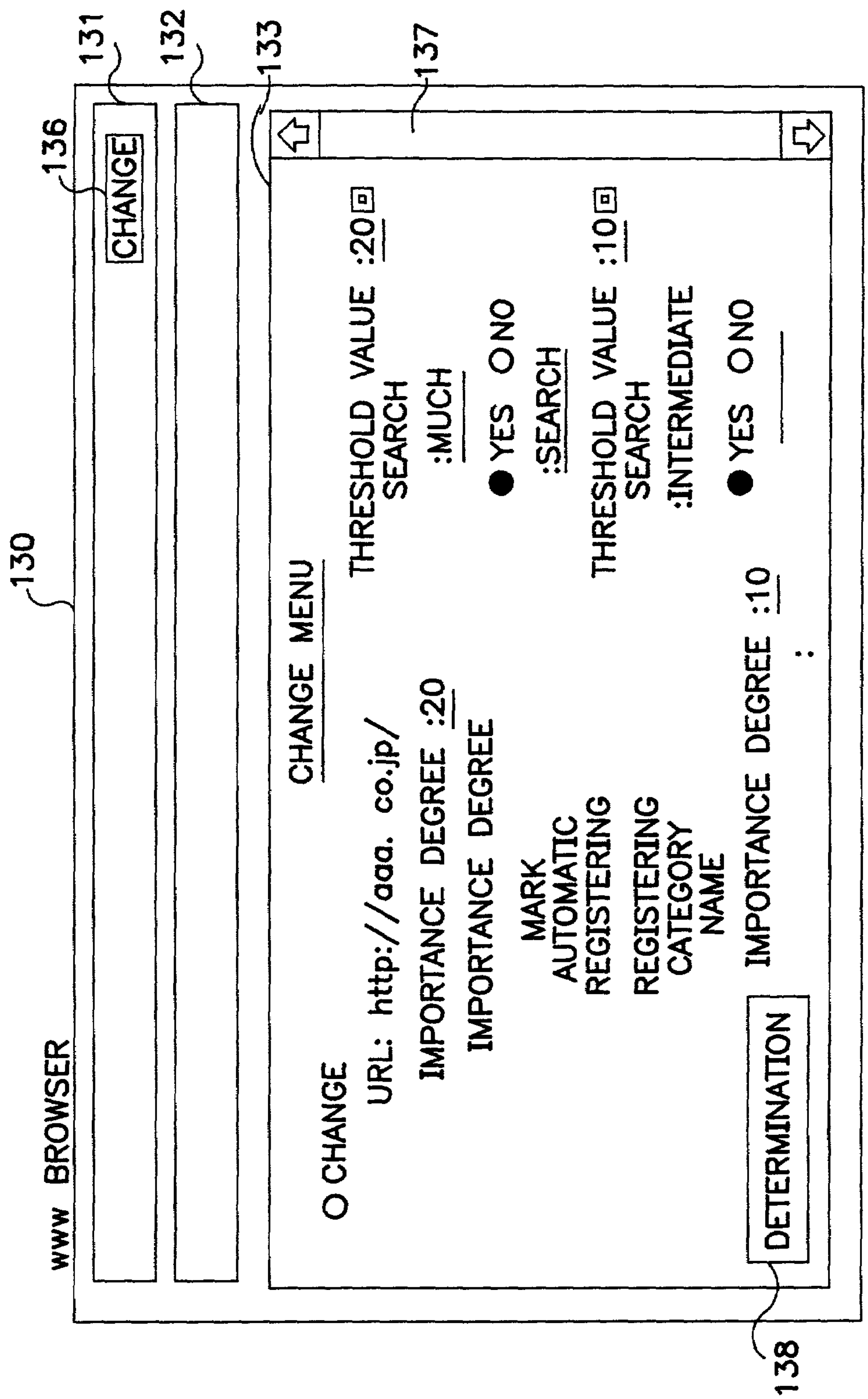
FIG. 6 is a block diagram of an image to be changed in a definition management note.

FIG. 6 is a block diagram showing an example of image to be changed in the definition management note. In the display area 133 of the image to be changed, a list is provided of the information registered of all URLs of the definition management note 18. When a large amount of information is registered, it is required to manipulate the scroll bar 137. A user can change the relevant definition information by selecting the radio button in front of "change" and then clicking the determination button 138. The information to be changed is the information (given the underline in the image) registered in the image registered. However, automatic registering can be changed by selecting the radio button in front of "YES" and "NO". Here, when the category name is changed, the relevant URL registered with the old category name of bookmark is automatically transferred to the new category name.

Figure 7:
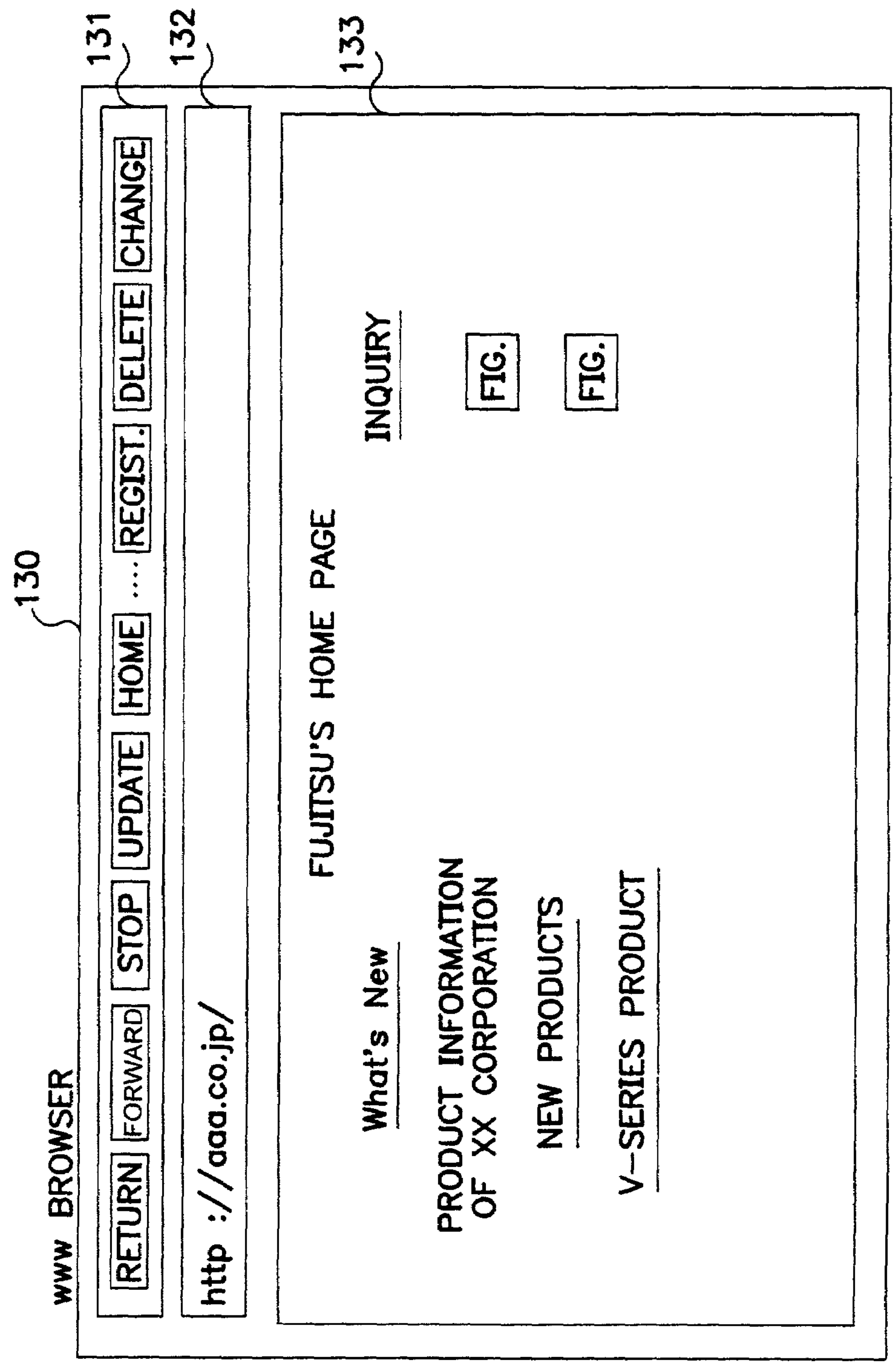
FIG. 7 is a block diagram of a Web page accessed by a WWW browser according to a preferred embodiment of the present invention.

FIG. 7 is a block diagram showing a display example of the Web page to the WWW browser. The URL (http://aaa.co.jp/) of the Web page is displayed in the address area 133. "What's New", "INQUIRY", "NEW PRODUCTS", "V SERIES PRODUCT" which are given the underlines in the display area 133 indicate the URL of another Web page or URL of file data. This figure indicates that a figure is displayed in the Web page.

Figure 8:
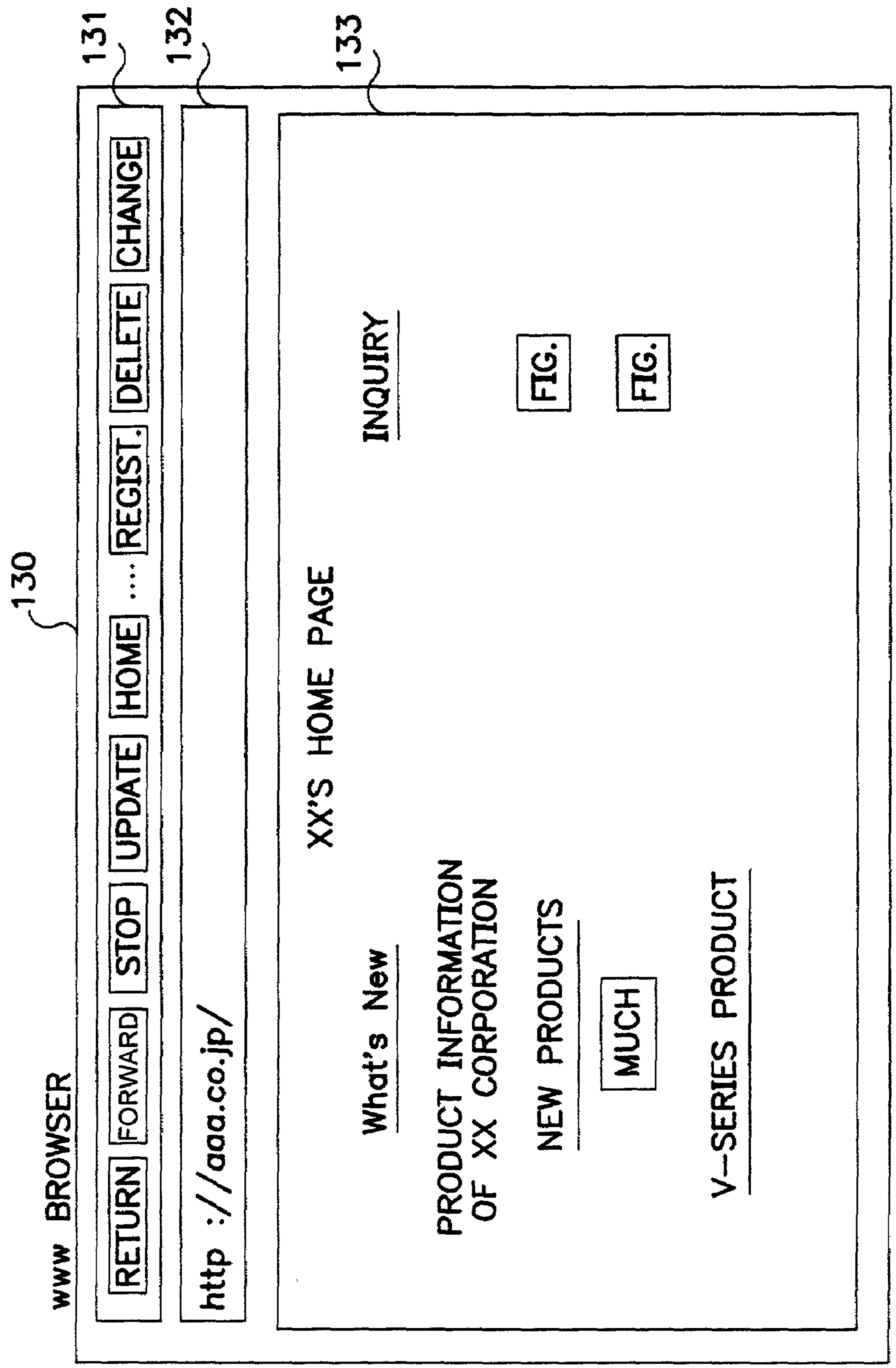
FIG. 8 is a block diagram of a Web page accessed according to a degree of importance.

FIG. 8 is a block diagram showing a display example of importance degree to the Web page. In the display area 133, a Web page similar to FIG. 7 should be displayed. The URL of "V SERIES PRODUCT", given the underline, is registered to the definition management note 18 and the number of times of display has therefore reached the threshold value of the degree of importance of the definition management note 18. In this case, "Importance" is the degree of importance mark which is displayed as an underline in "V SERIES PRODUCT".

Figure 9:
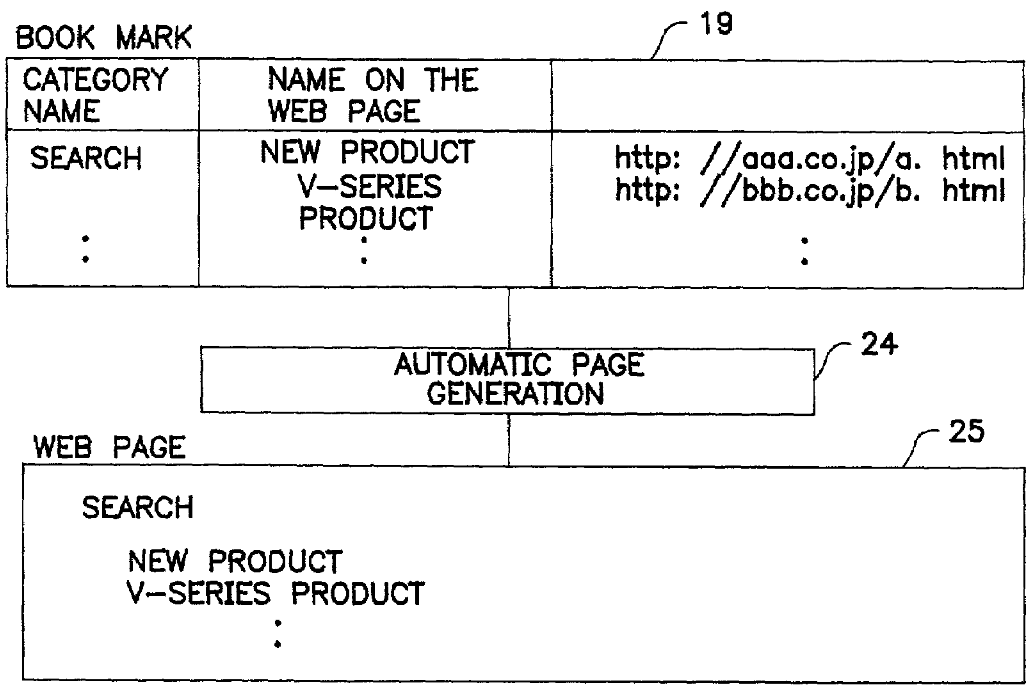
FIG. 9 is a block diagram of a Web page that was automatically generated from a bookmark.
Figure 10B:
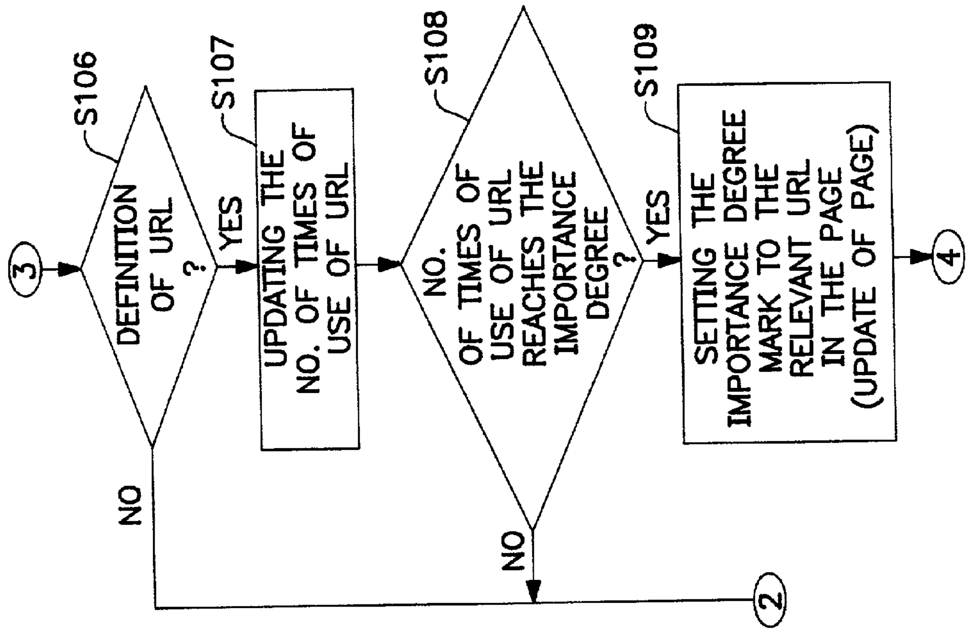
FIGS. 10A–10D are flowcharts of a display process according to a preferred embodiment of the present invention.
Figure 10A:
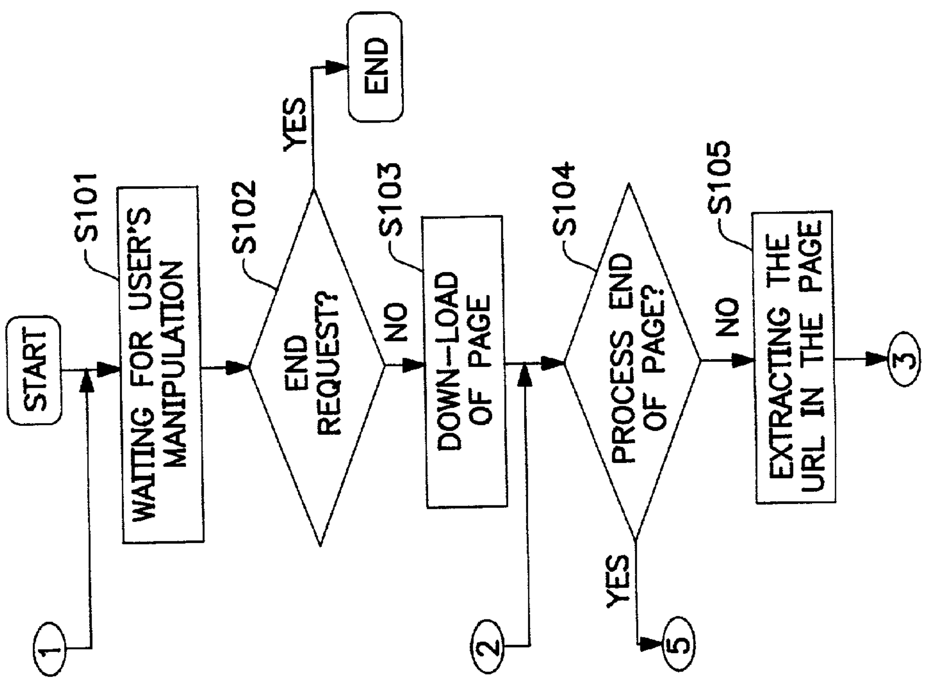
Figure 10D:
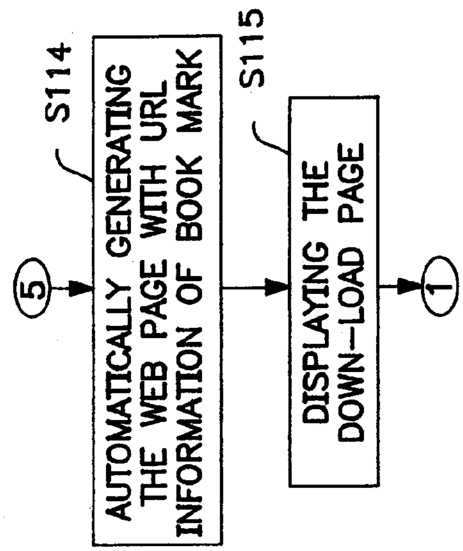
Figure 10C:
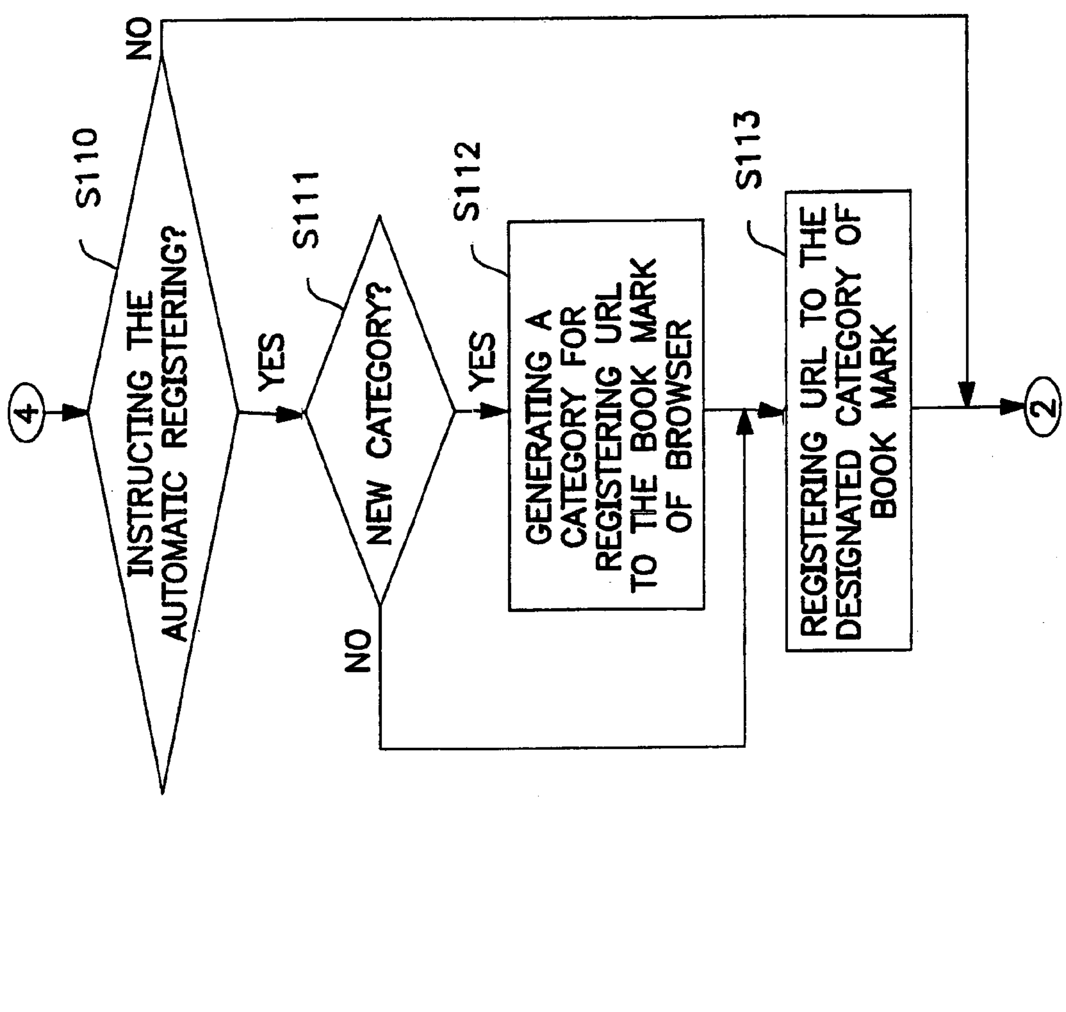

FIG. 9 is a block diagram showing an example of automatically generating a Web page from the bookmark. Since the storing format to the bookmark is different depending on the WWW browser, the information stored in the bookmark generally includes the category name and URL of the Web page. The automatic page generation unit 24 generates the Web page 25 from the information of bookmark 19. The underline indicates that the name one the Web page is URL. For example, a user clicks the "V series product" of the Web page 25, and the Web page of "http://bbb.co.jp/b.html" is displayed. Moreover, the Web pages are displayed in the Web page 25 in the sequence of the larger number of times of display because the URLs of bookmark are sorted in the sequence of the larger number of times of display by the automatic registration control unit.

FIGS. 10A–10D represent a flowchart indicating the display process. In explanation of this flowchart, the number following the letter S indicates the step number. In step, S101, the WWW browser waits, upon activation, for instruction for manipulation from a user. In step S102, when an end request is issued from the WWW browser, the process of WWW browser is completed. In other cases, the process goes to the step S103.

In step S103, the page corresponding to the URL designated by the WWW browser is down-loaded from the server. However, when the latest page exists at the terminal where the WWW browser operates, it is not required to down-load the pages from the server. Turning to step S104, all processes are completed for the URL described in the page, the process goes to the step S114 and in other cases, the process goes to the step S105.

In step S105, URLs described in the page are sequentially extracted. Likewise, in step S106, when the extracted URL is registered to the definition management note, the process goes to the step S107. In other cases, the process goes to the step S104. Step S107 updates the number of times of display of the relevant URL of the definition management note (counted up). In step S108, when the number of times of display of the relevant URL reaches the threshold value corresponding to the degree of importance of the definition management note, the process goes to the step S109 and in other cases, the process goes to the step S104.

In step S109, the degree of importance mark is set (update of the Web page) to the relevant URL in the page with letters, images, voices or density of color, etc. In step S110, automatic registering to the bookmark of the WWW browser is designated to the relevant URL of the definition management note, the process goes to the step S111 and in other cases, the process goes to the step S104.

In step S111, when the category for registering the relevant URL exists within the bookmark of the WWW browser, the process goes to the step S113 and in other cases, the process goes to the step S112. For step S112, when the category (folder or directory) to which the relevant URL is registered is newly generated in the bookmark of the WWW browser.

In step S113, the relevant URL is additionally registered to the category of bookmark of the WWW browser and the additionally registered URLs of the category are sorted in the sequence of the number of times of display and the process goes to the step S104. In step S114, a Web page is generated (when it is already generated, it is updated) with the URL of the bookmark 19. For step S115, the Web page (down-loaded Web page or Web page displaying the degree of importance) is displayed in the WWW browser and the process goes to the step S101.

Figure 11A:
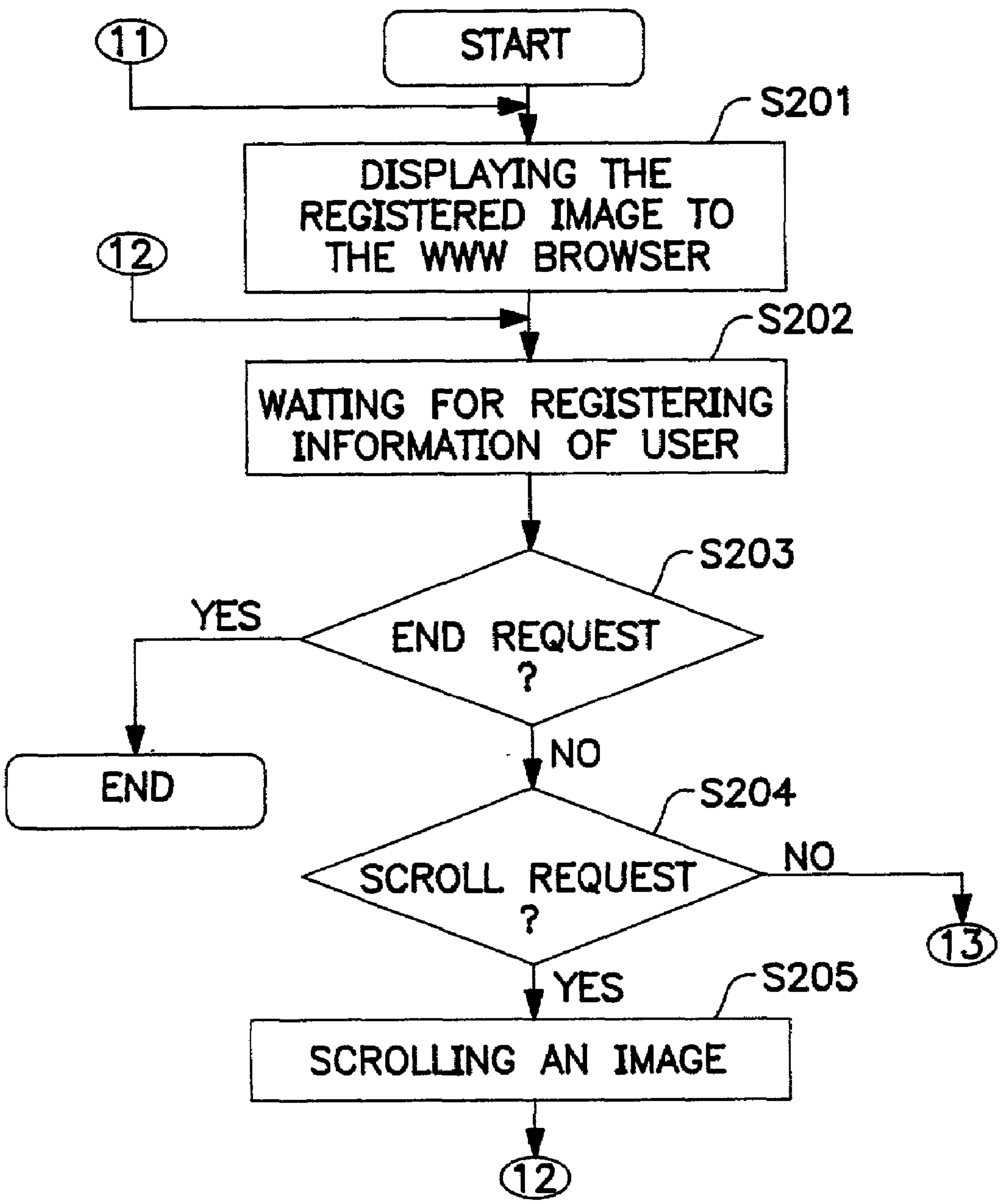
FIG. 11A-11B are flowcharts of a registering process according to a preferred embodiment of the present invention.
Figure 11B:
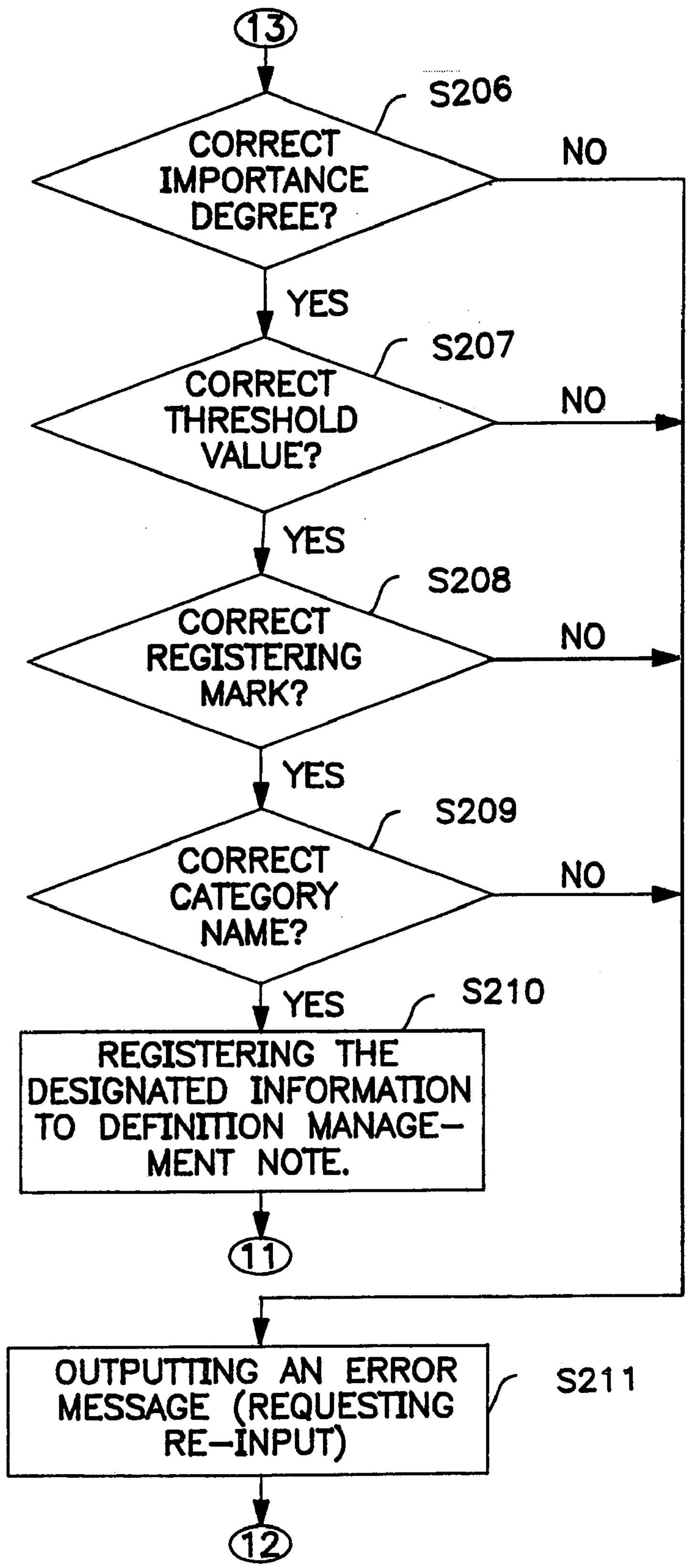

FIG. 11A-11B represent a flowchart showing the registering process. The number following the letter "S" indicates the step number in the explanation of the flowchart. According to step S201, when the registration icon of the tool bar of WWW browser is clicked, the registered image of the URL being displayed is then displayed. In step S202, the browser waits for input of registering information from a user.

As shown by step S203, when the WWW browser issues the end instruction, the process of WWW browser is completed. In other cases, the process goes to the step S204. Likewise in step S204, when the scroll request is issued, the process goes to the step S205. In other cases, the process goes to the step S206 because the registering information is input.

In step S205, the information of registered image is scrolled and the process goes to the step S202. For step S206, when the designated importance degree is correct (for example, a value within the allowable range), the process goes to the step S207. In other cases, the process goes to the step S211.

Turning to step S207, when the designated threshold value is correct (for example, a value within the allowable range), the process goes to the step S208. In other cases, the process goes to the step S211. Likewise, in step S208, when the designated registering mark is correct (for example, letters or designated file exists), the process goes to the step S209. In other cases, the process goes to the step S211.

In step S209, when the designated category name is correct (for example, alphanumeric letters in the allowable range), the process goes to the step S210. In other cases, the process goes to the step S211. For step S210, the degree of importance, threshold value, registering mark, "YES" or "NO" of automatic registering to bookmark, category name and URL name input from the registered image are registered to the definition management note and the process goes to the step S201.

Turning to step S211, an error message to request re-input is output to the registered image and the process goes to the step S202.

Figure 12A:
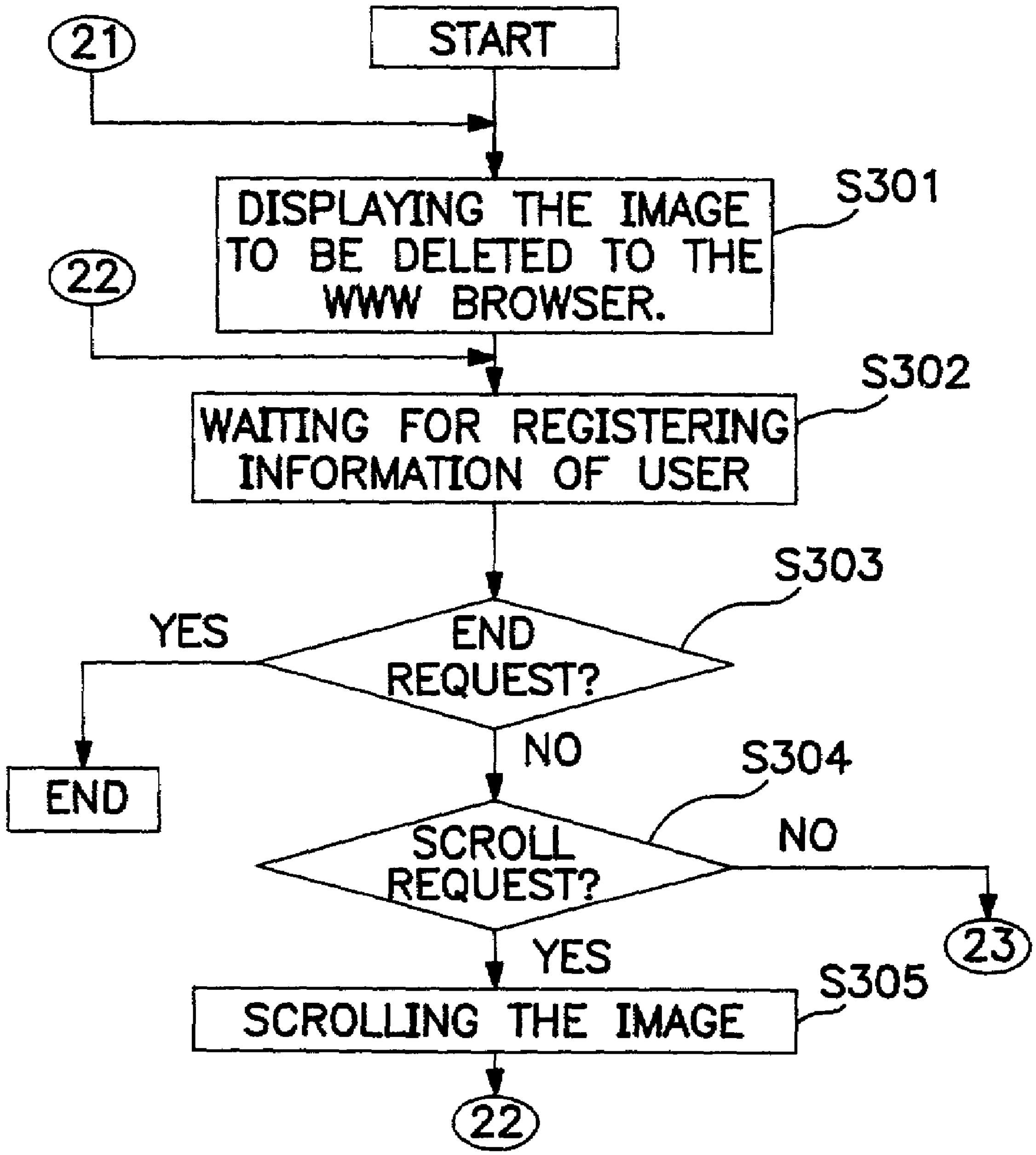
FIG. 12A-12B are flowcharts of a deleting process according to a preferred embodiment of the present invention.
Figure 12B:
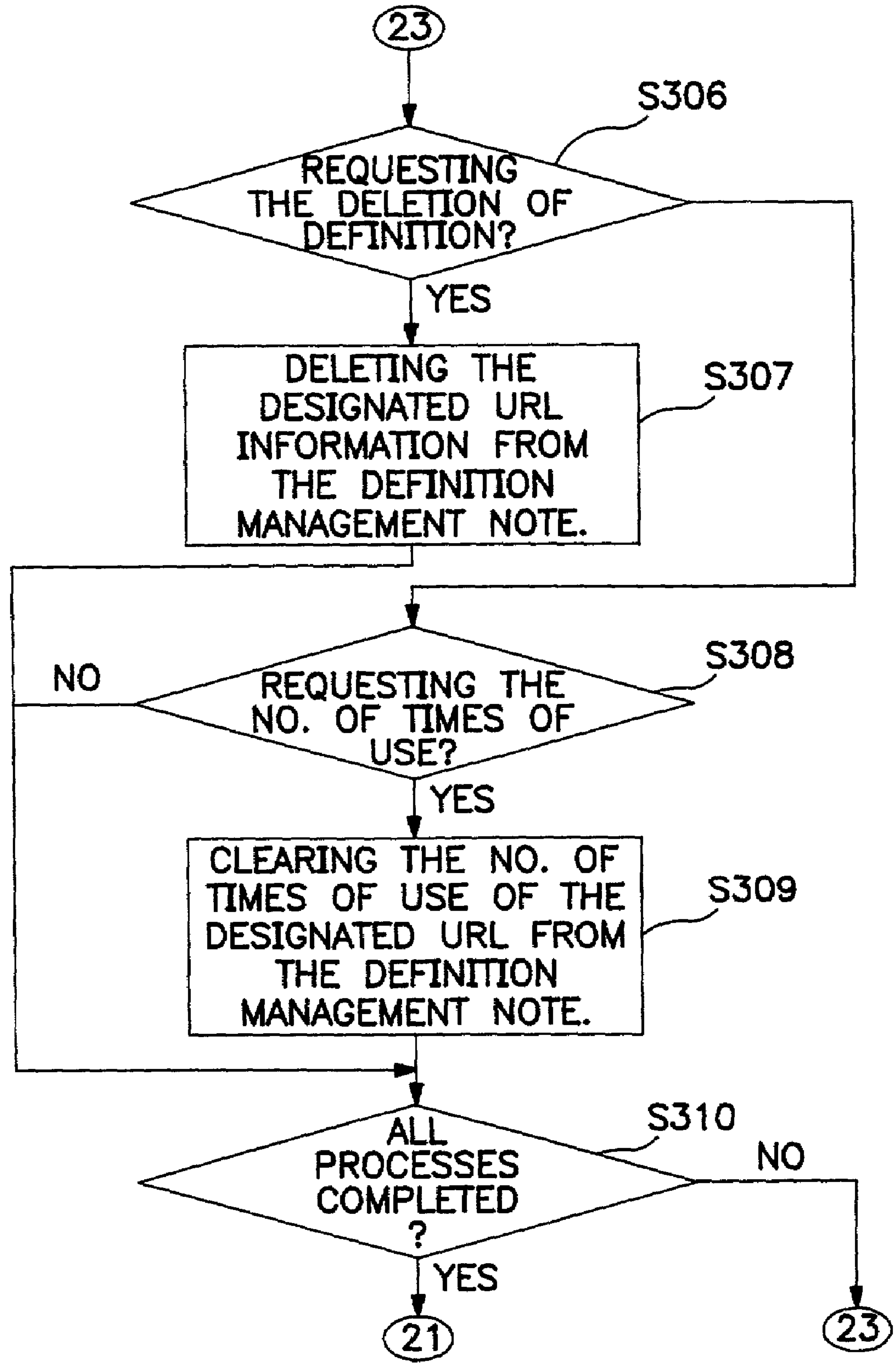
Figure 13A:
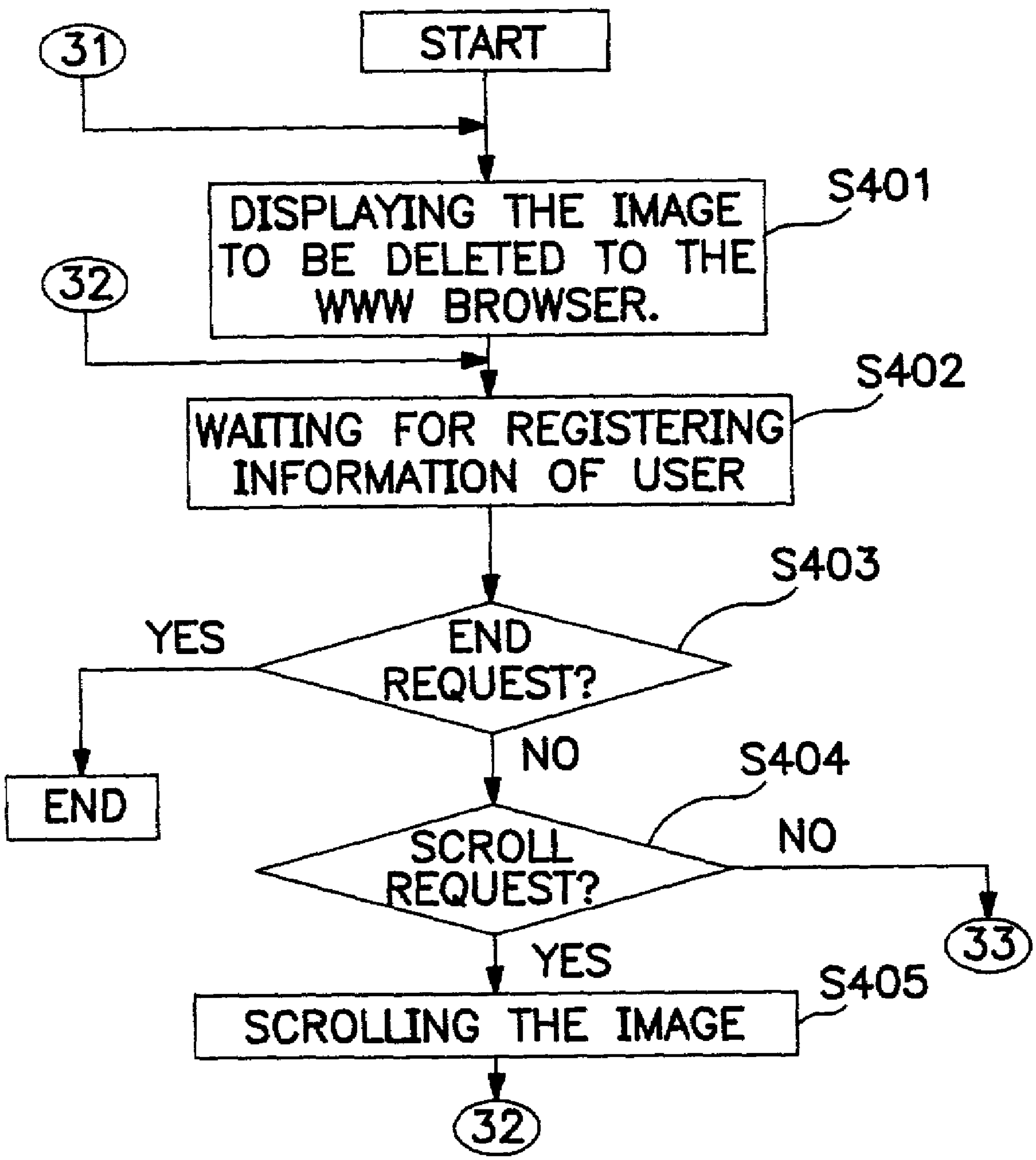
FIG. 13A-13D are flowcharts of a changing process according to a preferred embodiment of the present invention.
Figure 13B:
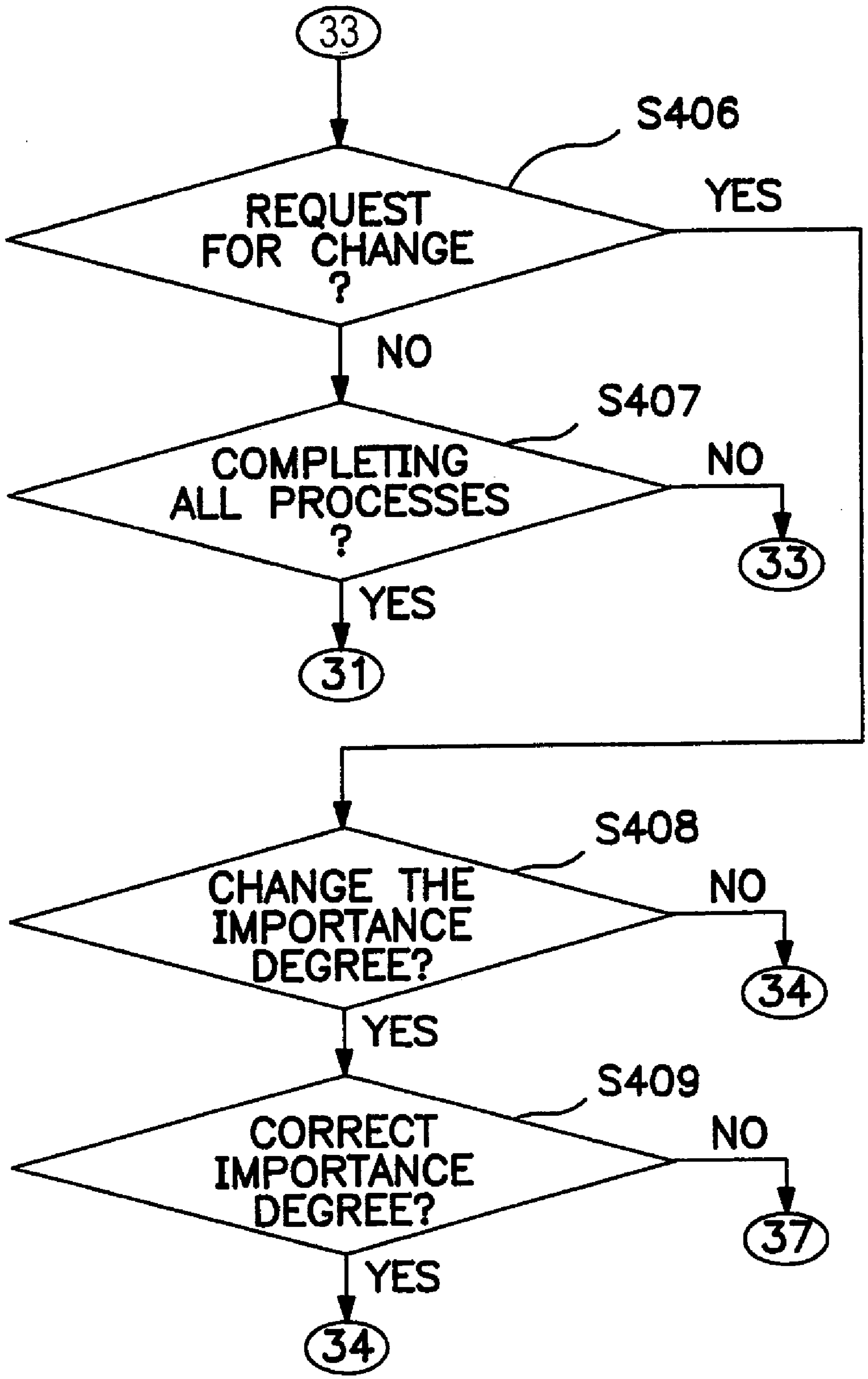
Figure 13C:
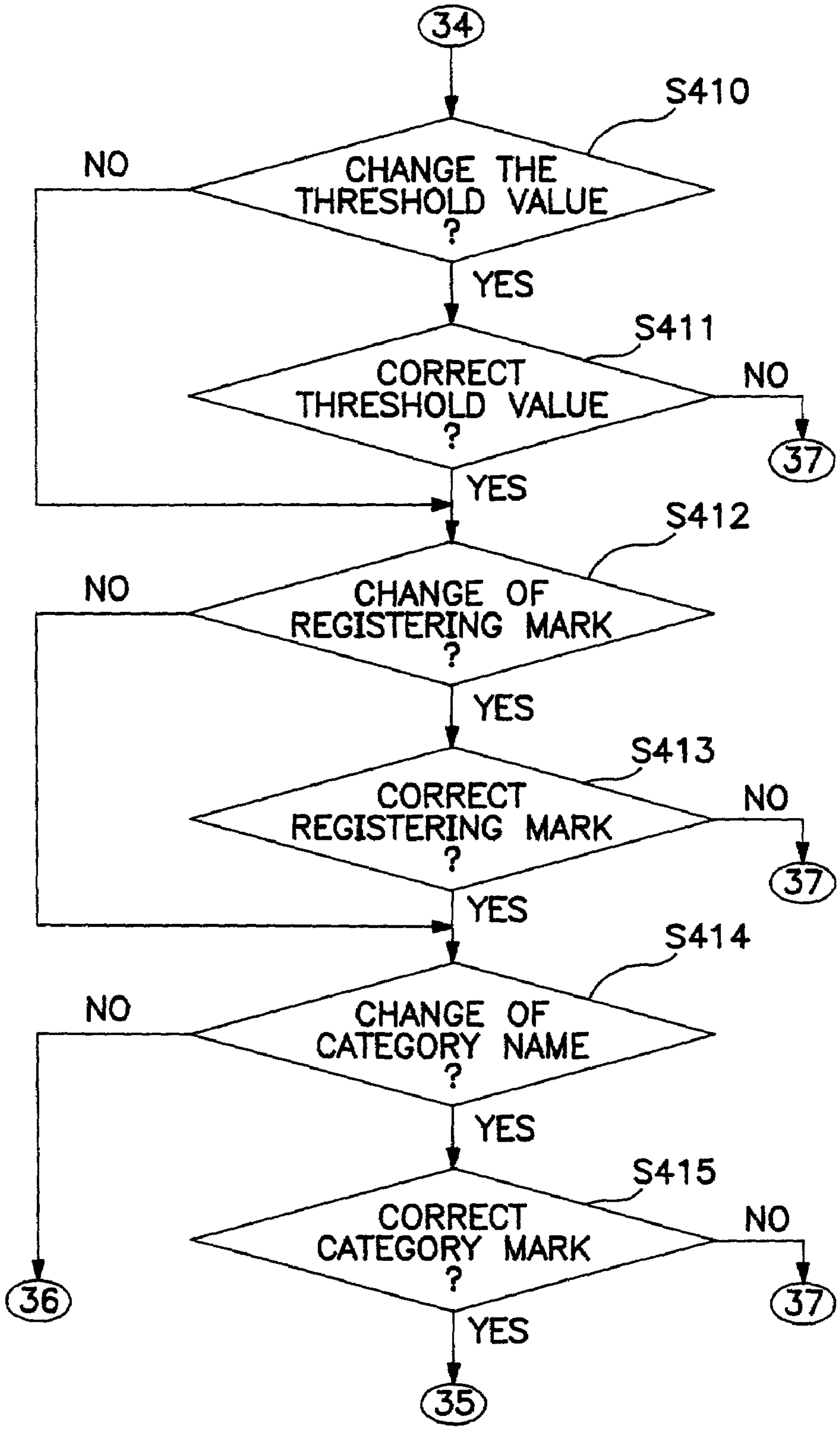
Figure 13D:
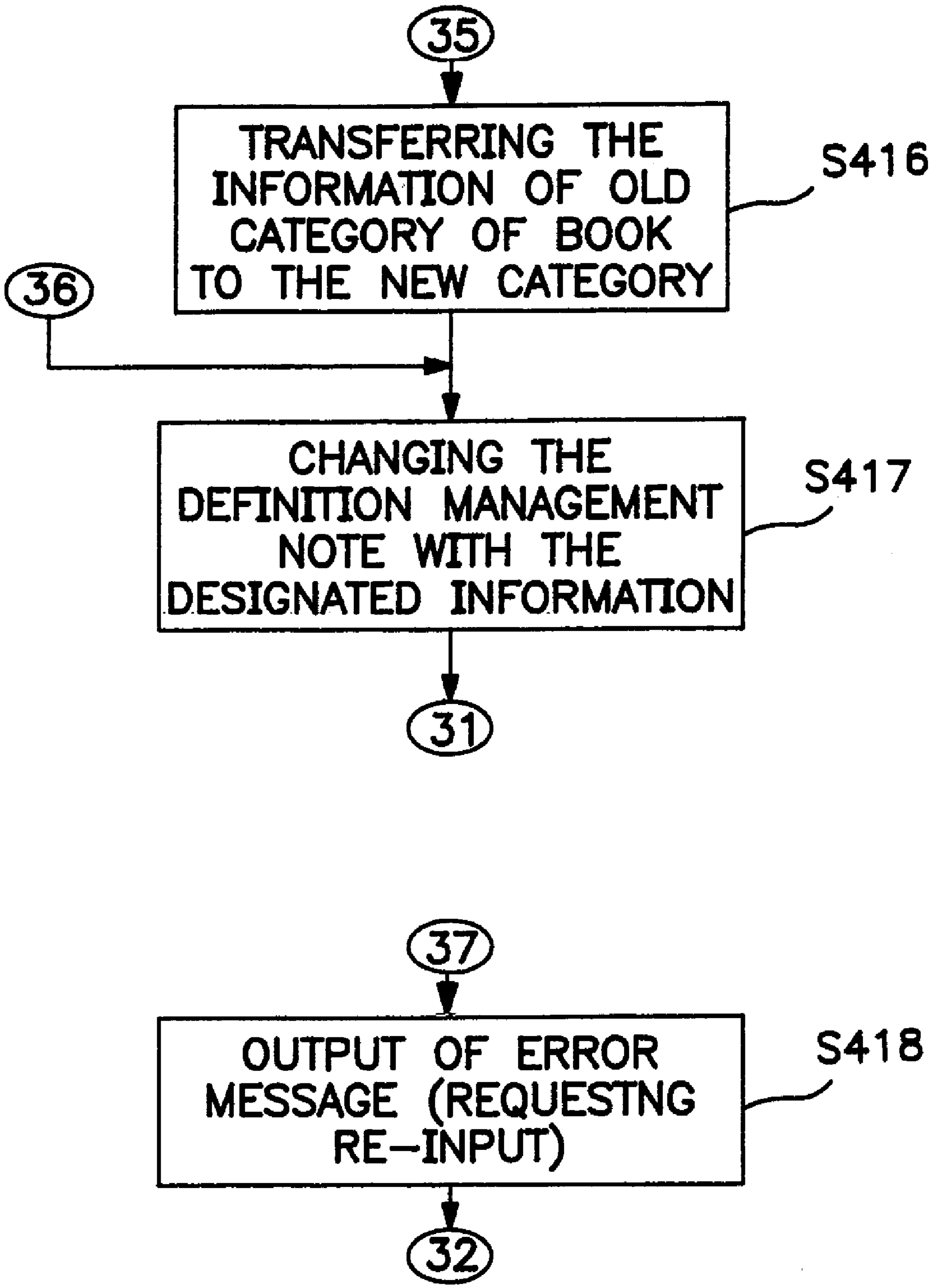
Figure 14:
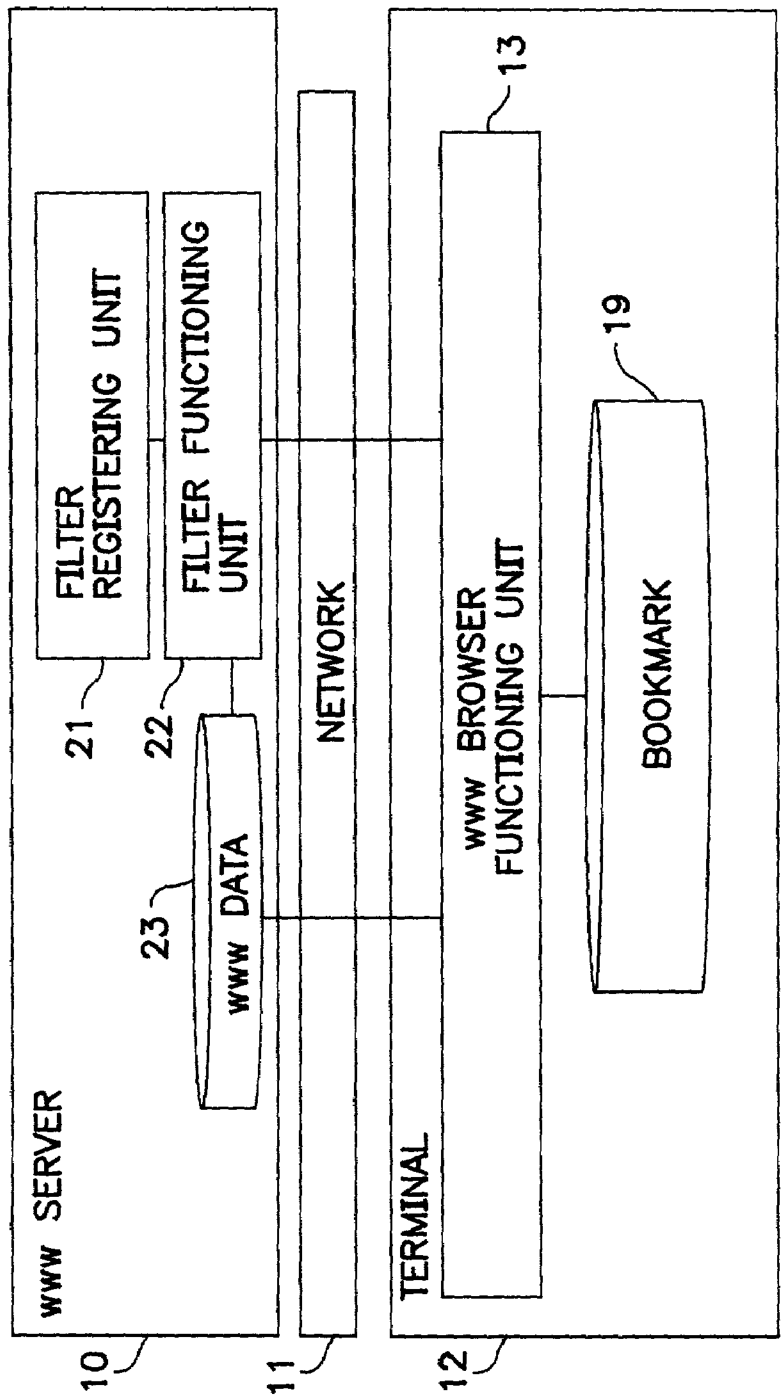
FIG. 14 (PRIOR ART) is a block diagram of a conventional WWW browser according to the related art.

FIG. 12A-12B represent a flowchart showing the deleting process. In the explanation of this flowchart, the number following the letter S indicates the step number.

In step S301, when the deleting icon of the tool bar of WWW browser is clicked, a list of the URLs registered in the definition management note is displayed in the image to be deleted. In step S302, the WWW browser waits for input of the registering information from a user.

For step S303, when the WWW browser issues an end instruction, the process of WWW browser is completed. In other cases, the process goes to the step S304. In step S304, when the scroll request is issued, the process goes to the step S305. In other cases, the process goes to the step S306 because the deleting information is input.

In step S305, information in the registered image is scrolled, and the process goes to the step S302. For step S306, when the definition deleting request is issued, the process goes to the step S307. In other cases, the process goes to the step S308. As illustrated in step S307, after the URL information selected from the definition management note is all deleted, the process goes to the step S310.

In step S308, when the number of times of display deleting request is issued, the process goes to the step S309. In other cases, the process goes to the step S310. According to step S309, after only the number of times of display of the URL selected from the definition management note is cleared, the process goes to the step S310. In step S310, when process is completed for all URLs designated, the process goes to the step S301. In other cases, the process goes to the step S306.

FIG. 13A-13D represent a flowchart showing the changing process. In the explanation of this flowchart, the number following the letter S indicates the step number. As shown in step S401, when the changing icon of the tool bar of WWW browser is clicked, a list of the URLs registered in the definition management note is displayed in the image to be changed. By way of step S402, the WWW browser waits for input of changing information from a user. For step S403, when the WWW browser issues an end request, the process of WWW browser is completed. In other cases, the process goes to the step S404.

As illustrated in step S404, when the scroll request is issued, the process goes to the step S405. In other cases, the process goes to the step S406 because the changing information is input. In step S405, after the information of image to be changed is scrolled, the process goes to the step S402. In step S406, when the change of URL is selected, the process goes to the step S408. In other cases, the process goes to the step S407.

By way of step S407, when process is completed for all URLs designated, the process goes to the step S401. In other cases, the process goes to the step S406. Likewise, in step S408, when the degree of importance is changed (when the degree of importance is different from the preceding contents), the process goes to the step S409. In other cases, the process goes to the step S410.

For step S409, when the designated importance degree is correct (for example, a value within the allowable range), the process goes to the step S410. In other cases, the process goes to the step S418.

Turning to step S410, when the threshold value is changed (threshold value is different from the preceding contents), the process goes to the step S411. In other cases, the process goes to the step S412. By way of step S411, when the designated threshold value is correct (for example, a value within the allowable range), the process goes to the step S412. In other cases, the process goes to the step S418.

As illustrated in step S412, when registering mark is changed (registering mark is different from the preceding contents), the process goes to the step S413. In other cases, the process goes to the step S414. By way of step S413, when the designated registering mark is correct (for example, letters or designated file exists), the process goes to the step S414. In other cases, the process goes to the step S418.

For step S414, when the category name is changed (category name is different from the preceding contents), the process goes to the step S415. In other cases, the process goes to the step S417. Likewise, in step S415, when the designated category name is correct (for example, an alpha-numeric latter in the allowable range), the process goes to the step S416. In other cases, the process goes to the step S418.

By way of step S416, the relevant URL in the old category name of the bookmark is transferred to the new category name. For step S417, the information of the definition management note of the relevant URL name is changed with the degree of importance, threshold value, registering mark, "YES" or "NO" of automatic registering to bookmark and category name input from the image to be changed and the process goes to the step S401. After an error message to request re-input is output to the registered image, the process goes to the step S402.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A viewer to display images on a display unit, the images being accessible by associated uniform resource locators (URLs), the viewer comprising:

a definition management note to store a number of times of display of any image which has been accessed by an associated URL; and an importance degree control unit to count a number of times of display of any image accessed by the associated URL, wherein the importance degree control unit outputs the number for storage by the definition management note, wherein the definition management note stores a plurality of URLs that are associated with a plurality of images, each of which respectively corresponds to at least one threshold value that is associated with the image, and wherein the importance degree control unit executes a process of setting an importance degree mark, which is to be displayed for the associated URL on the display unit, when the counted number of times of display of any image accessed by the associated URL exceeds one of the corresponding stored threshold value associated with the image.

2. A viewer as claimed in claim 1, wherein each of the threshold values stored in said definition management note have an associated displayable image as a counting object.

3. A viewer as claimed in claim 2, said viewer being a browser that displays Web pages accessed via the Internet as the images, wherein said definition management note defines an importance degree for each URL which has been accessed a number of times exceeding an associated threshold value, and wherein said importance degree control unit executes a process corresponding to an importance degree mark for each URL having an associated importance degree.

4. A viewer as claimed in claim 2, said viewer being a browser that displays Web pages accessed via the Internet as the images, wherein an importance degree mark corresponding to an importance degree is defined for each URL stored in said definition management note, and wherein said importance degree control unit selects processes for each of the importance degree marks depending on the number of times of display.

5. A viewer as claimed in claim 2, said viewer being a browser that displays Web pages accessed via the Internet as the images, wherein said importance degree mark is a program object that notifies users that a number of times of display of associated Web pages is indicated by a density of color, or by enhancing characters or images being displayed within the associated Web page.

6. A viewer as claimed in claim 2, said viewer being a browser that displays Web pages accessed via the Internet as the images, wherein said importance degree control unit updates the counted number of times of display of a corresponding Web page before the Web page is displayed with the browser, and wherein said importance degree control unit executes a process designated by said importance degree mark on the basis of the counted number of times of display.

7. A viewer as claimed in claim 2, said viewer being a browser that displays Web pages accessed via the Internet as the images, wherein said importance degree control unit can add, change, and delete information in the definition management note relating to a Web page being displayed by said browser.

8. A viewer as claimed in claim 1, wherein said viewer is a browser that displays Web pages accessed via the Internet as the images, the viewer further comprising:

an automatic registration control unit to register Web pages that have exceeded the stored threshold value to a bookmark.

9. A viewer as claimed in claim 8, wherein said automatic registration control unit is provided with a sorting function to rearrange a registration sequence of Web pages in the bookmark depending on the number of times of display.

10. A viewer as claimed in claim 9, further comprising:

an automatic page generating unit to automatically generate Web pages from corresponding URLs registered in the bookmark.

11. A viewer as claimed in claim 1, wherein said viewer is a browser that displays Web pages accessed via the Internet as the images, the viewer further comprising:

an automatic registration control unit to register Web pages that have been displayed greater than a threshold value to a bookmark.

12. A viewing method performed at a terminal for running a browser, the browser to display Web pages on a display unit of the terminal, the Web pages having associated URLs, the method comprising:

storing a plurality of threshold values for the associated URLs;

counting a number of times of display of a Web page accessed by an associated URL; and executing a particular process when the counted number of times exceeds one of threshold values associated with the URL, said particular process including setting an importance degree mark, which is to be displayed for the associated URL on the display unit, when the counted number of times of display of the Web page exceeds the one of the threshold values.

13. The viewing method according to claim 12, wherein the particular process notifies users that the threshold value of a number of times of display has been exceeded through display in a Web page.

14. The viewing method according to claim 13, wherein the counted number of times of display of a corresponding Web page is updated before the Web page is displayed with the browser.

15. A display method for displaying an image on a display unit, the image being accessible by an associated uniform resource locator (URL), the display method comprising:

storing a plurality of threshold numbers that are associated with the associated URL;

storing a number of times of display of the image that has been accessed by the associated URL; and counting a number of times of display of the image accessed by the associated URL;

comparing the number of times of display of the image accessed by the associated URL with a threshold number associated with the associated URL; and setting an importance degree mark, which is to be displayed for the associated URL on the display unit, when the counted number of times of display of the image that has been accessed by the associated URL exceeds the threshold number.

16. The viewing method according to claim 15, wherein the counting counts a number of times of display of Web pages accessed with a browser via the Internet, the method further comprising:

registering a Web page which has been displayed greater than the threshold number to a bookmark.

17. The viewing method according to claim 15, wherein said browser displays Web pages via the Internet, further comprising:

notifying users that a threshold value of a number of times of display has been exceeded through display in a Web page.

18. A browser to display a Web page on a display unit, the Web page being accessed via the Internet by an associated URL, the browser comprising:

a definition management note to store a number of times of display of any Web page which has been accessed by an associated URL, wherein the definition management note stores a plurality of URLs, each of which respectively corresponding to at least one threshold values that are associated with the Web page; and an importance degree control unit to count a number of times of display of any Web page accessed by the associated URL, wherein said importance degree control unit outputs the number for storage by said definition management note, wherein the importance degree control unit executes a process of setting an importance degree mark, which is to be displayed for the associated URL on the display unit, when the counted number of times of display of any Web page accessed by the associated URL exceeds one of the corresponding stored threshold values associated with the associated URL.

19. The browser according to claim 18, wherein said importance degree control unit executes a process of an importance degree mark when the counted number of times of display of any Web page accessed by the associated URL exceeds one of the corresponding stored threshold values.

20. A process, performed by a browser or a terminal hosting the browser, to allow display of user-activatable indicia of a resource previously loaded by the browser or terminal that is identified by a corresponding Uniform Resource Locator (URL), the process comprising:

on an occurrence, accessing-and-displaying a resource identified by the corresponding URL, where the accessing-and-displaying is not a first time accessing-and-displaying a resource identified by the corresponding URL;

at a time later than the occurrence, when displaying a user-activatable indicia of the URL, displaying the user-activatable indicia of the URL with a first visual emphasis that is based on the prior occurrence of accessing-and-displaying the corresponding resource;

on an other occurrence that is later than the occurrence, accessing-and-displaying the same or another resource identified by the corresponding same URL; and at a time later than the other occurrence, when displaying a user-activatable indicia of the URL, displaying the user-activatable indicia of the URL with a second visual emphasis that is based on the prior other occurrence of accessing-and-displaying the corresponding resource, where the second visual emphasis is different than the first visual emphasis.

21. A process according to claim 20, further comprising:

on a further occurrence that is later than the other occurrence, accessing and displaying the same or another resource identified by the corresponding same URL; and at a time later than the further occurrence, when displaying a user-activatable indicia of the URL, displaying the user-activatable indicia of the URL with a third visual emphasis that is based on the prior further occurrence of accessing or displaying the corresponding resource, where the third visual emphasis is different than the first and second visual emphases.

22. A process according to claim 20, wherein the browser is adapted to load and display markup-language resources or documents and the resource identifiable by a corresponding URL comprises markup-language.

23. A volatile or nonvolatile computer-readable storage storing information for causing a computer to perform a process according to claim 20.

* * * * *